(12) United States Patent
Jha

(10) Patent No.: US 11,834,347 B2
(45) Date of Patent: Dec. 5, 2023

(54) AUTOMATICALLY RECONFIGURABLE WATER FILTRATION DEVICE

(71) Applicant: Eshani Jha, San Jose, CA (US)

(72) Inventor: Eshani Jha, San Jose, CA (US)

(73) Assignee: Eshani Jha, San Jose, CA (US)

( * ) Notice: Subject to any disclaimer, the term of this patent is extended or adjusted under 35 U.S.C. 154(b) by 0 days.

(21) Appl. No.: 16/994,995

(22) Filed: Aug. 17, 2020

(65) Prior Publication Data

US 2020/0377379 A1 Dec. 3, 2020

(51) Int. Cl.
| | | |
|---|---|---|
| C02F 1/00 | (2023.01) | |
| C02F 1/28 | (2023.01) | |
| C02F 101/30 | (2006.01) | |
| C02F 101/20 | (2006.01) | |

(52) U.S. Cl.
CPC ............ C02F 1/008 (2013.01); C02F 1/28 (2013.01); *C02F 1/281* (2013.01); *C02F 1/283* (2013.01); *C02F 2101/20* (2013.01); *C02F 2101/305* (2013.01); *C02F 2101/306* (2013.01); *C02F 2201/005* (2013.01); *C02F 2201/006* (2013.01); *C02F 2209/008* (2013.01); *C02F 2209/40* (2013.01)

(58) Field of Classification Search
None
See application file for complete search history.

(56) References Cited

U.S. PATENT DOCUMENTS

| 6,753,186 B2 | 6/2004 | Moskoff |
| 10,351,455 B2 | 7/2019 | Moller et al. |
| 2002/0130069 A1* | 9/2002 | Moskoff ............... G01N 33/18 210/85 |
| 2006/0060512 A1* | 3/2006 | Astle .................... B01D 29/606 210/85 |
| 2018/0201520 A1* | 7/2018 | Padiyath ................ C02F 1/283 |

(Continued)

FOREIGN PATENT DOCUMENTS

WO WO 2013/126477 A1 8/2013

OTHER PUBLICATIONS

Tebo et. al., Biogenic manganese oxides: properties and mechanisms of formation. Annu. Rev. Earth Planet. Sci., (2004) 32, 287-328.

(Continued)

*Primary Examiner* — Richard C Gurtowski

(57) ABSTRACT

A water purification system configured to continually monitor input water for the presence of heavy metal or organic chemical contaminants. The system automatically selects different types of filtration material, such as functionalized biochar filtration material, to purify the heavy metal or organic chemical contaminated water by automatically directing the water to filtration cartridges containing the filtration material best suited to removing the detected contaminants. The system is equipped with a processor, suitable sensors, and a plurality of removable cartridges. Each cartridge has a different type of filtration material, and each cartridge is equipped with a memory chip that can inform the processor as to the filtration capabilities of that particular cartridge. The system can keep track of its history of operation, and automatically notify operators when cartridges need to be replaced.

12 Claims, 3 Drawing Sheets

(56) References Cited

U.S. PATENT DOCUMENTS

2018/0299410 A1   10/2018  Merrill et al.
2019/0225521 A1*  7/2019   Heath ...................... C02F 9/00

OTHER PUBLICATIONS

Aceves-Mijares, "Determination of heavy metals contamination using a silicon sensor with extended responsive to the UV", Journal of Physics: Conference Series 421 (2013) 012016.

Eshani Jha, Bhoopesh Mishra, Felix Grun, "Doped biochar for the removal of pesticides, emerging contaminants, and heavy metals from water", ACS Fall 2020 Virtual Meeting & Expo in Environmental Chemistry Section, in press (expected publication date Aug. 28, 2020).

* cited by examiner

AUTOMATICALLY RECONFIGURABLE WATER FILTRATION DEVICE

BACKGROUND OF THE INVENTION

Field of the Invention

This invention is in the field of water purification systems and methods.

Description of the Related Art

Water potability remains a key challenge of modern civilization. Worldwide, over two billion people lack access to clean water and at least 80% of the world's wastewater is dumped back into the environment without proper treatment, polluting rivers, lakes, and oceans. Meanwhile, the earth's freshwater sources are finite: less than 1% of the earth's water is easily accessible to us through rivers, lakes, and streams, and nearly half of this water is heavily polluted.

The Agency for Toxic Substances and Disease Registry releases a Substance Priority List biannually to address this issue of water contamination, ranking contaminants in order of their toxicity and potential for exposure. According to this list, three classes of contaminants are of primary concern: organochlorine pesticides such as pp-DDT and pp-DDE (a metabolite of pp-DDT), emerging contaminants such as dimetridazole (a pharmaceutical) and bisphenol A (a microplastic), and heavy metals such as arsenic, lead, mercury, and cadmium.

Pesticides are commonly used to protect crops and play a significant role in food production. However, only 5% of sprayed herbicides and 2% of sprayed insecticides reach their intended destinations or target species. The remaining pesticides are transported via runoff and wind to aquatic environments, grazing areas, and human settlements. Of special concern are organochlorine pesticides, which have long half-lives that allow them to persist in the environment decades after initial exposure.

pp-DDT, an organochlorine insecticide, was commonly used to control infectious disease vectors, such as mosquitoes. Because it has a half-life of 150 years, even though it was discontinued two decades ago, it remains prevalent in aquatic environments, thereby acting as a sink for long-term exposure. pp-DDT degrades to form pp-DDE. pp-DDT and pp-DDE are then readily taken up by organisms from surrounding media and food due to its high lipid solubility, which allows for retention in fatty tissue and subsequent biomagnification along the food chain. One effect of exposure is hyperplasia, which is the enlargement of organs or tissues due to increased reproductions rates of cells. This leads to tumor formation (cancer). pp-DDT and pp-DDE are also endocrine disruptors that activate estrogen receptors and inhibit androgen receptors, leading to inappropriate expression of important genes. On the Substance Priority List, pp-DDT is ranked 15th while pp-DDE is ranked 21st.

Heavy Metals: Due to their widespread applications, heavy metals have established a ubiquitous presence in the environment. Concerns regarding their detrimental effects on humans and the ecosystem are not issues to be associated only with developing countries (e.g. Bangladesh), but also highly developed countries such as the US itself (e.g. Flint, MI lead poisoning). On the Substance Priority List, arsenic ranks 1st, lead ranks 2nd, mercury ranks 3rd, and cadmium ranks 7th.

Current water filters commonly use activated carbon. Activated carbon effectively removes chemicals such as chlorine and volatile organic compounds such as benzene from water. Examples of such prior art filters include the work of Bradford, U.S. Pat. No. 9,550,138. However, such activated carbon approaches tend to be ineffective at removing organochlorines, other organic chemical contaminants, and heavy metals from water.

Activated carbon is a more generic term loosely used for carbonaceous materials that have undergone some form of physical or chemical activation. For example, a coconut husk passed through steam is activated carbon. Within the activated carbon family, there are two classes of well-defined chemical processes: pyrolysis and hydrothermal carbonization.

Biochar, which a type of pyrolyzed carbon, is produced by the chemical breakdown of carbonaceous feedstocks under high temperatures (typically between 450° C. and 850° C.) in an inert atmosphere. Biochar can also be physically or chemically activated using acids, steam, gases, and/or metals. Biochar is composed of carbon matrices, giving it a chemically stable honeycomb-like structure and providing a perfect substrate for physical and chemical modifications. Biochar can be synthesized from biomass (e.g. wood) and can simultaneously retain the functional groups and properties of the initial feedstock. The work of Moller, U.S. Pat. No. 10,351,455 have shown that biochar can be used for water treatment.

Other workers, such as Tebo et. al., *Biogenic manganese oxides: properties and mechanisms of formation. Annu. Rev. Earth Planet. Sci.*, (2004) 32, 287-328. Have shown that functionalized biochar resulting from the addition of dopants (e.g. minerals and inorganics) to the carbon matrix can demonstrate an improved enhancement in the rate and extent of contaminant uptake. Other workers, including Gao, WO 2013/126477, have shown that zinc oxide (ZnO) and thiol (SH) groups are also useful contaminant scavengers.

Prior art on analyte sensors useful for detecting heavy metal contaminants in water includes the work of Moskoff, U.S. Pat. No. 6,753,186; Aceves-Mijares, "*Determination of heavy metals contamination using a silicon sensor with extended responsive to the UV*", Journal of Physics: Conference Series 421 (2013) 012016, and others. Prior art on analyte sensors useful for detecting organic chemical contaminants in water includes Merrill, "Continuous flow fluid contaminant sensing system and method", US patent publication 2018/0299410, and others.

BRIEF SUMMARY OF THE INVENTION

The invention was inspired, in part, on the insight that in some situations, the level of certain contaminants in water sources can vary both rapidly and unpredictably. For example, consider the now notorious case of lead contamination in the Flint Michigan water supply in the early 2010s. This problem was not merely a problem of lead pipes. Lead pipes had been used for over 100 years in Flint Michigan. Rather, the lead contamination problem rapidly and somewhat unexpectedly evolved when, in a cost-saving measure, from the Flint River was substituted in place of the previous water from the neighboring city of Detroit. Both water supplies could be cleaned up enough to produce adequately safe water drinking water. However Flint River water, which turned out to be more acidic, had the unexpected effect of knocking lead, which was otherwise harmlessly dissolved on the linings of the Flint pipes in a passivation layer, into the water itself. By contrast, the Detroit water had a higher level of phosphate ions that had been protecting the passivation layer. The result was a sudden and unexpected increase in the amount of lead (and other contaminants, such as trihalomethanes) delivered to the Flint population.

The invention was also inspired, in part, on the insight that due to advances in sensor technology, it has become increasingly feasible to perform real-time monitoring of water contaminants.

The invention is also inspired, in part, upon the inventor's experimental findings (discussed shortly) that there are significant differences in the ability of different filtration materials, such as different types of biochar, and different types of functionalized biochar, to bind to different contaminants.

In some embodiments, the invention may be a water purification system, device or method, such as a water purification system configured to continually monitor input water for the presence of heavy metal or organic chemical contaminants. The system automatically selects different types of filtration material, such as functionalized biochar filtration material, to purify the heavy metal or organic chemical contaminated water by automatically directing the water to filtration cartridges containing the filtration material best suited to removing the detected contaminants. The system is equipped with a processor, suitable sensors, and a plurality of removable cartridges. Each cartridge has a different type of filtration material, and each cartridge is equipped with a memory chip that can inform the processor as to the filtration capabilities of that particular cartridge. The system can keep track of its history of operation, and automatically notify operators when cartridges need to be replaced.

BRIEF DESCRIPTION OF THE DRAWINGS

FIG. 3 may be expanded to yet another embodiment of the device that can automatically switch to multitude of different cartridge, containing different suitable biochar materials, in response to detecting different types of inorganic and organic contaminants.

DETAILED DESCRIPTION OF THE INVENTION

Figure 1:
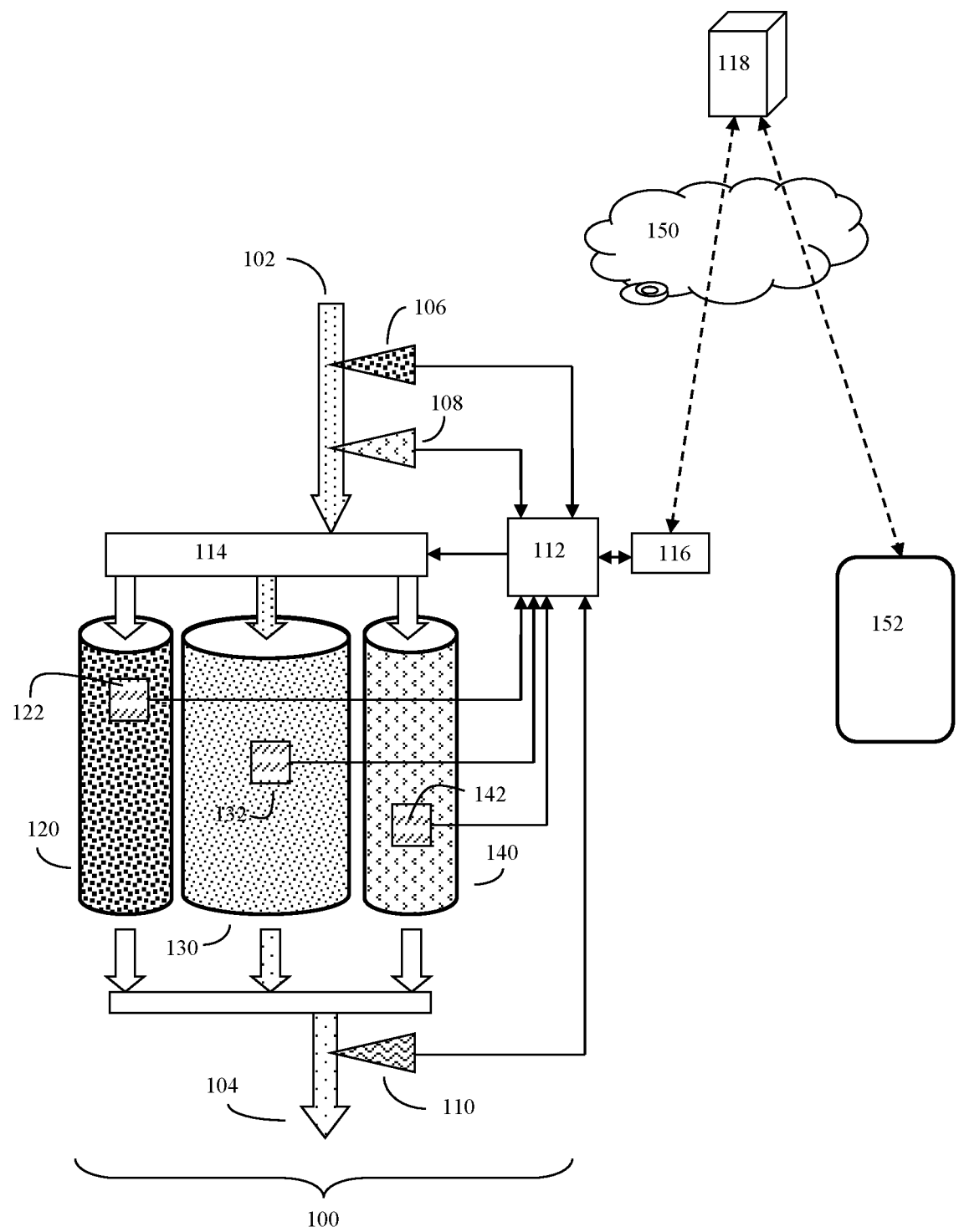
FIG. 1 shows an overview of the automatically reconfigurable water filtration device, which will typically comprise a plurality of different water flow filtration cartridges, which may contain more than one type of functionalized biochar filtration material.

In some embodiments, the invention may be a water filtration device, system, or method. Here we will generally use device or system terminology, but this terminology is not intended to be limiting.

The invention (expressed as a device) will typically comprise a water intake port (where un-purified or sub-optimally purified water enters the device) and a water exit port (where water, after purification, exits the device).

The device will also typically have at least one analyte sensor. This analyte sensor may be configured as a heavy metal sensor that can detect heavy metal contaminants in water and generate an electronic signal in response to these heavy metal contaminants. The device will also further comprise a water flow sensor configured to monitor a total flow of water (such as the volume of water as a function of time leaving the device through the exit port) through the water filtration device.

The device will also comprise at least one processor, typically any of a computer processor, microprocessor, or microcontroller having one or more cores. Examples of such processors include the popular x86, MIPS, ARM, 8051, MSP-430, as well as other types of processors, microprocessors, and microcontrollers. This processor will also comprise, or at least be connected to, computer memory such as flash, RAM, and ROM memory configured to store programming instructions and data.

This at least one processor will be configured to receive input from the one or more analyte sensors, such as a heavy metal sensor, and other sensors such as the water flow sensor. In some embodiments, this processor will also comprise, or be connected to, at least one processor-controlled wireless transceiver that in turn can connect to a computer network such as the internet.

The invention will also comprise a plurality (e.g. more than one) of different types of removable water filtration cartridges (here referred to as cartridges). As will be discussed in more detail shortly, each removable water filtration cartridge will typically comprise a cartridge water inlet, and a cartridge water exit and each cartridge will typically comprise walls of water-impermeable material (often made of plastic). The cartridges are hollow (at least before filling with filtration material) and each cartridge will typically be filled with at least one filtration material, typically biochar, and in a preferred embodiment, functionalized biochar material. The cartridge(s) may also contain other materials, such as porous supports to help hold the filtration material in place. In a preferred embodiment, each different cartridge will comprise different types of biochar material, each with different abilities to bind to different heavy metal contaminants and/or different organic chemical contaminants.

Although water may often travel through the filtration cartridges under the force of incoming water pressure or gravity, supplemental pumps may also be used, as desired.

Each removable cartridge will also comprise a device to store computer-readable data reporting on the water filtration characteristics of that particular cartridge. In some embodiments, this will comprise an electronic memory chip, such as a flash or ROM chip, that may be affixed to some location on the cartridge, such as affixed to an outer wall of the cartridge, with suitable electrodes enabling the memory chip to communicate with the device's processor.

Thus, in some embodiments, the device may comprise multiple removable cartridges, such as a first removable cartridge comprising a first biochar material and a first electronic memory chip reporting on first water filtration properties of that first biochar material and that removable cartridge. The device will also comprise at least a second removable cartridge comprising a second biochar material and a second electronic memory chip reporting on second water filtration properties of that second biochar material and the second cartridge. Other cartridges may also be used, as desired.

According to the invention, at least the first biochar material and the second biochar material will be different biochar materials that are chosen to differ in at least their ability to bind to heavy metal contaminants in water. The first electronic memory chip and the second electronic memory chip provide information to the device's processor that reports on these differences. In a two-cartridge system, it is not necessary that each cartridge be able to remove heavy metal contaminants (or organic chemical contaminants) from water, so long as at least one is. In a three or more-cartridge system, in a preferred embodiment, one cartridge may be optimized for heavy metal contaminant removal, and a different cartridge may be optimized for organic chemical contaminant removal.

The device also comprises a processor-actuated valve configured to direct water from the device's water intake port to any of the (water inlets of the) at least first or second removable cartridges, as well as additional cartridges, as desired.

The processor is configured, usually with suitable embedded or downloaded software, to acquire information from the sensors, such as the analyte sensor(s) (e.g. the heavy metal sensor), and the water flow sensor. The processor then uses information from these sensors, as well as information from the first electronic memory chip, and the second electronic memory chip, to perform various functions.

These functions can include configuring the processor-actuated valve to distribute water from the device's water intake port to those first removable cartridges and second removable cartridges that best minimize the quantities of detected contaminants exiting the device through the water exit port. If, for example, heavy metal contaminants are detected, the system can direct the input water to that filter cartridge (or combination of filter cartridges) best able to remove these detected heavy metal contaminants. Thus, in this example, the invention acts to dynamically reconfigure itself to minimize the amount of the heavy metal contaminants in the water flowing out of the device's water exit port. Similarly, the device can also use suitable analyte sensors and filter cartridges to minimize organic chemical contaminants as well.

The functions can also include configuring using the processor to determine, based on the history (e.g. readings stored in computer memory over time from the water flow sensor) of the total flow of water through the water filtration device since the last relevant filter change), the amount and type of sensor detected contaminants, (such as heavy metal contaminants reported by the device's analyte sensors) that have passed through the device since the last relevant filter change.

The processor can also obtain additional information (such as the ability of each removable cartridge to remove varying amounts of contaminants from water) from the first electronic memory chip and the second electronic memory chip, and other electronic chips as relevant. The processor can then determine if any of the removable cartridges have exhausted their filtration ability, need to be replaced. This would be the case if the processor calculates that the contaminant removal capability of a given cartridge has been exceeded.

In a preferred embodiment, the device processor is further configured to transmit to one or more external computerized devices, such as at least one internet server, information such at least the history of the total flow of water through the water filtration device since the last relevant cartridge change, at least the calculated amount of heavy metal contaminants absorbed by any of the cartridges, and if either the first or second removable cartridge should be replaced. This transmission can be done using the device's at least one processor-controlled wireless transceiver. This information can then be presented to the operator of the water filtration device, and the operator can then maintain the device by changing filters, as needed.

FIG. 1 shows an overview of the automatically reconfigurable water filtration device (100). As previously discussed, this device comprises a water intake port (102) and a water exit port (104). The device will have at least one analyte sensor. These analyte sensors can comprise at least one heavy metal sensor (106), and/or at least one organic chemical sensor (108) such as a pesticide chemical sensor, microplastic sensor or a pharmaceutically active chemical sensor.

As previously discussed, the device will also typically have at least one water flow sensor (110) configured to monitor the total flow of water through the device (e.g. flow of water that ultimately exits the device). The device will further comprise at least one computer processor (112) (usually a microprocessor or microcontroller) configured to monitor and control the device as described below.

Also as previously discussed, the device can also comprise a plurality of removable cartridges (such as 120, 130, 140) here shown as cylindrical cartridges, although other shapes may also be used). These removable cartridges need not be the same size and shape, and need not have the same internal volume. These removable cartridges are filled with various types and amounts of water filtration materials such as biochar and/or functionalized biochar that can remove various types of impurities from the input water. Typically, the different removable cartridges will contain different types of biochar and/or functionalized biochar. Thus, for example, a removable cartridge (120) will contain a first type of biochar or functionalized biochar, removable cartridge (130) will contain a second type of biochar and/or functionalized biochar, and optional removable cartridge (140) may contain a third type of biochar and/or functionalized biochar.

Because each removable cartridge will typically contain its own unique type of biochar and/or functionalized biochar, and possibly its own unique quantity of filtration material as well, it is useful to configure each cartridge (e.g. 120, 130, 140) to communicate the water filtration properties of that cartridge to the processor (112). This can be done by various methods. One convenient method is to configure each cartridge with an electronic memory chip (typically a flash memory chip, or a ROM memory chip). Thus, for example, a cartridge (120) will comprise memory chip (122), the cartridge (130) may comprise a memory chip (132), and optional cartridge (140) may comprise a memory chip (142). These memory chips can contain information on the amount of biochar filtration material per cartridge, as well as the filtration properties of that particular cartridge. These filtration properties, can, for example, report on those cartridges' relative ability to filter certain heavy metal contaminants and/or certain organic chemical contaminants out of the input water. The total amount of certain contaminants that can be removed by the cartridge, and other materials such as cartridge expiration dates, cartridge identification codes, or other authentication codes, expiration dates, etc., may also be reported.

Note that there is no requirement that the different replaceable cartridges (120, 130, 140) all be the same size or all have the same amount of filtration material. In situations where the input water source typically does not have high levels of heavy metal or organic chemical contaminants, it may be useful to employ a higher capacity (larger, more filtration material) cartridge, such as (130), to handle expected situations where the level of heavy metal or organic chemical contaminants are low. In this case, the other removable cartridges may be smaller (lower amount of filtration materials) and may be used primarily in situations where there is an unexpected influx of heavy metal or organic chemical contaminated input water. Alternatively, all filter cartridges may be the same size, or the filter cartridges configured to handle a more expected type of contamination may be larger.

Thus, in situations where there is an ongoing level of heavy metal contaminants (such as lead contaminants), it may be useful to configure a larger capacity cartridge with a heavy metal removing filtration material, and configure the smaller "contingency" cartridges to handle situations where unexpected contaminants are suddenly detected. In some embodiments, the system may further employ additional processor-controlled water flow valves (not shown) to enable the input water to pass through more than one cartridge before it reaches the exit port.

The various memory chips may transfer their stored information to the processor (112) by either direct electrical contact (e.g. by wires contacting electrodes) or by short-range wireless methods. Here RFID or near-field communication (NFC) methods may be used as desired. In any event, the various memory chips and the processor and any additional circuitry connecting the processor with the memory chips are configured so that data stored in the various memory chips can be communicated to the computer processor (112).

The device will also comprise at least one processor actuated valve (114). This valve (114) is configured so that control signals from the processor (112) can configure the valve (114) to direct input water from the water intake port (102) to flow to either cartridge (120, the cartridge (130), or optionally to the cartridge (140) and/or other cartridges. In the example shown in FIG. 1, the processor is shown directing the flow of the input water to the cartridge (130).

The processor (112) will typically further comprise, or at least can be configured to control, a wireless transceiver (116), such as a cellular, WIFI, or Bluetooth transceiver. The processor (112) can thus use this wireless transceiver (116), optionally in conjunction with various other devices such as various cellular towers, Wi-Fi routers, or Bluetooth routers to connect with one or more remote servers (118) over the internet (150). These remote internet servers (118) can then store information from the device in server memory, and/or relay this information to other computerized devices (152), often controlled by the owner or user or operator or maintainer of the device (100). These computerized devices (152) can be smartphones, tablet computers, laptop computers, desktop computers, and the like.

As will be discussed in the experimental section, the inventor has found that certain types of functionalized biochar filtration materials are superior to other types of biochar filtration materials. Thus, in some embodiments, any of the first or second biochar material may comprise thiol-functionalized milled rice husk biochar, and the thiol-functionalized milled rice husk biochar may often be configured to further bind to any of organic water-borne contaminants.

In some embodiments, any of these first and second thiol-functionalized milled rice husk biochar can comprise $MnO_2$—SH doped milled rice husk biochar material. Alternatively, or additionally, in some embodiments, any of the first and second thiol-functionalized milled rice husk biochar can comprise ZnO—SH doped milled rice husk biochar material.

Figure 2:
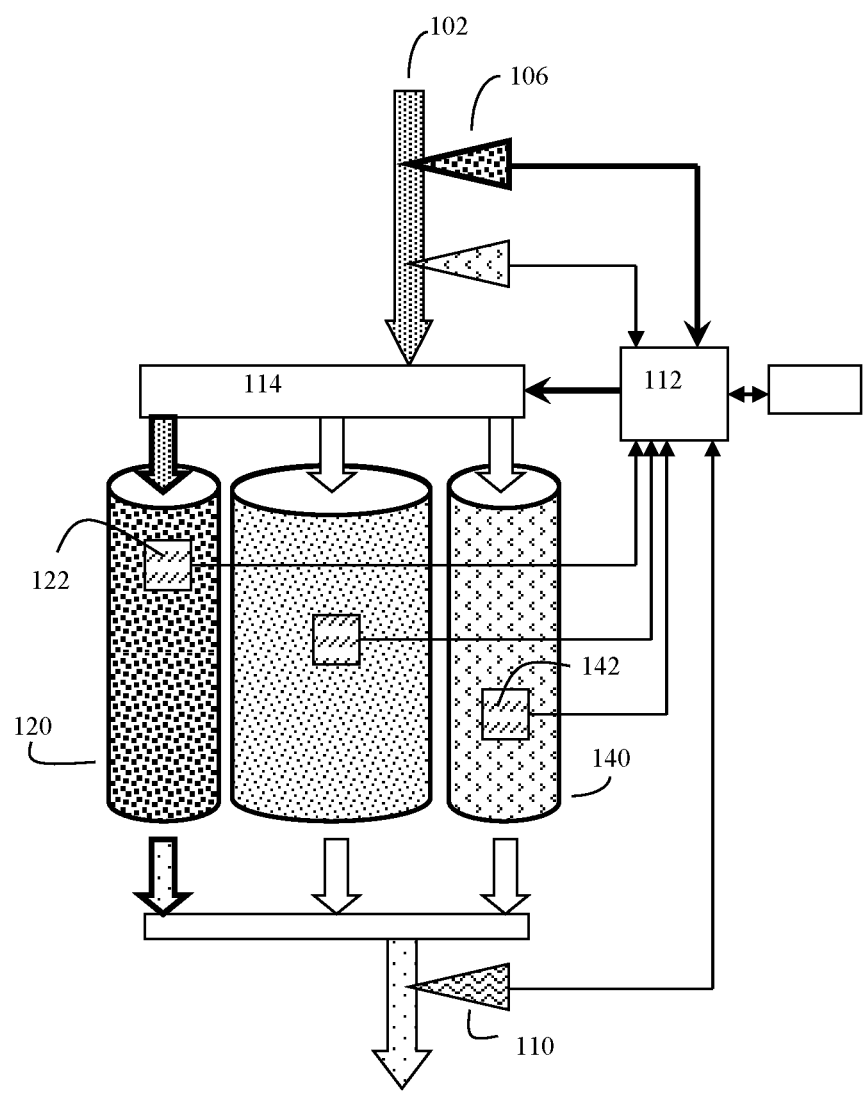
FIG. 2 shows how the device can automatically switch to a different cartridge, containing a more suitable biochar-based filtration material, in response to detecting certain types of contaminants, such as heavy metal contaminants or certain organic chemical contaminants.

FIG. 2 shows how the device can automatically switch to a different cartridge, containing a more suitable biochar-based filtration material, in response to detecting certain types of input water contaminants, such as heavy metal contaminants or certain organic chemical contaminants. In this example, assume that sensor (106) is a heavy metal sensor, and this sensor now reports to the processor (112) that the water arriving at an input port (102) contains a high level of heavy metal contaminants. Processor (112), which previously received filter cartridge capability information from memory chips (122), (132), and optionally (142) knows that cartridge (120) has the best heavy metal filtration capability (this is because, in this example, cartridge 120 contains a functionalized biochar with a composition best optimized for removing heavy metals from water, and also has been recently changed). As a result of receiving the signal from sensor (106), processor (112), and the filter cartridge information from the memory chips, the processor then directs processor actuated valve (114) to now direct the flow of heavy metal contaminated water to the cartridge (120) best suited to filter out heavy metal contaminants.

The processor may also optionally generate an alarm signal and optionally transmit this to the server (118) as well. The processor (112) also uses signals from the heavy metal sensor (106), and the water flow sensor to determine the likely total amount of heavy metals passing through the cartridge (120) since the last cartridge change. Here, for example, this amount can be:

Concentration (from analyte sensor)×water-flow-amount (from water-flow sensor)=observed-amount The processor can further compute the amount of remaining heavy metal filtration capacity in the cartridge (120) by using:

Initial-filtration-ability (from memory chip 122)–observed-amount=remaining amount Thus here, once the remaining amount drops before zero, the processor (112) can determine that the heavy metal removal ability of cartridge (120) is now exhausted. The processor (112) transmits suitable alarm messages, and/or additionally configure valve (114) to shut off the water flow entirely, or redirect the water flow to another cartridge determined not to be exhausted yet.

As shown in FIG. 1 and FIG. 2, in some embodiments, the water filtration device may have more than two cartridges. In particular, in some embodiments, it may be useful to have at least one chemical cartridge optimized for removing heavy metal contaminants, and at least one different chemical cartridge optimized for removing organic chemical contaminants.

Thus, in some embodiments, as previously discussed, the water filtration device may further comprise an organic chemical sensor (108) configured to detect organic chemical contaminants in the water. These organic chemical contaminants can, for example, comprise any of an organic chemical pesticide and an organic chemical pharmaceutical.

Here, as previously discussed, the processor (112) can be configured to use information from the heavy metal sensor (106), the organic chemical sensor (108), the water flow sensor (110), the first electronic memory chip (such as 122), and the second electronic memory chip (132) (and other cartridge memory chips if present) to configure the processor actuated valve (114) to distribute water from the water intake port (102) to any of the first removable cartridge (120) and the second removable cartridge (132) (or other removable cartridges) so as to minimize both an amount of the heavy metal contaminants and the amount of organic chemical contaminants in the water flowing out of the water exit port (104).

As before, the processor (112) can be configured to determine, based on the history of the total flow of water through the water filtration device since the last cartridge change (as determined by sensor 110), and sensors (106, and 108) the heavy metal contaminants, and the organic chemical contaminants, flowing through the cartridges. The processor can also use information from the first electronic memory chip (122) and the second electronic memory chip (132) (and other electronic memory chips if present) to determine if either the first or second removable cartridge (or other removable cartridges) is now exhausted (can't bind any further contaminants) and should be replaced.

As before, the processor (112) can also be configured to transmit, to at least one internet server (such as 118), and a wireless transceiver (116), information such as the history of the total flow of water through the water filtration device, at least since the last cartridge change, the sensor observed heavy metal contaminants, the sensor observed organic chemical contaminants, and the processor's determination if any of the cartridges should be replaced.

Although the discussion until now has primarily focused on devices containing two removable water filtration cartridges, the drawings have generally shown three removable cartridges. Here a three-cartridge embodiment will be discussed in more detail. In general, this three-cartridge embodiment is an extension of the two-cartridge methods discussed above. Similarly, devices with more than three removable cartridges may also be used, and these can operate as a logical extension of the above techniques).

In this embodiment, the water filtration device may further comprise a third removable cartridge (140) comprising a third biochar material, and a third electronic memory chip (142) reporting on third water filtration properties of this third biochar material. Here the first biochar material (for example, in cartridge 120) and the second biochar material (for example, in cartridge 130) may be selected to differ from the third biochar material (in cartridge 140) in at least their ability to bind to organic chemical contaminants in water.

In this embodiment, as previously discussed, the processor (112) may be configured to accumulate information from the heavy metal sensor (106), the organic chemical sensor (108), the water flow sensor (110), the first electronic memory chip (122), the second electronic memory chip (132), and the third electronic memory chip (142). The processor will use this information to perform various functions.

As before, these functions can include configuring the processor-controlled actuator valve (114) to distribute water from the water intake port (102) to any of the first removable cartridge (120), the second removable cartridge (130), the third removable cartridge (140) to minimize both the level of heavy metal contaminants (detected by sensor 106) and an amount of the organic chemical contaminants (detected by sensor 108) in the water flowing out of the device's water exit port (104).

The processor (112) can also determine, based on a history of the total flow of water through the water filtration device (at least since the last cartridge change, and as detected by sensor 104), the concentration or amount of heavy metal contaminants (from sensor 106), and organic chemical contaminants (from sensor 108), and information from the first electronic memory chip (122), the second electronic memory chip (132), and the third electronic memory chip (142) if any of the first (120) or second (130) or third (140) removable cartridge should be replaced.

Again, as previously discussed, the processor (112) can further be configured to transmit, to at least one internet server (118), using the at least one processor-controlled wireless transceiver (116), at least the history of the total flow of water through the water filtration device, the heavy metal contaminants (computed by concentration per unit volume over the total volume flowing through the device since the last relevant cartridge was changed), the organic chemical contaminants (done the same way), and the determination if any of the first or second or third removable cartridges should be replaced. This is shown in more detail in FIG. 3, below.

Figure 3:
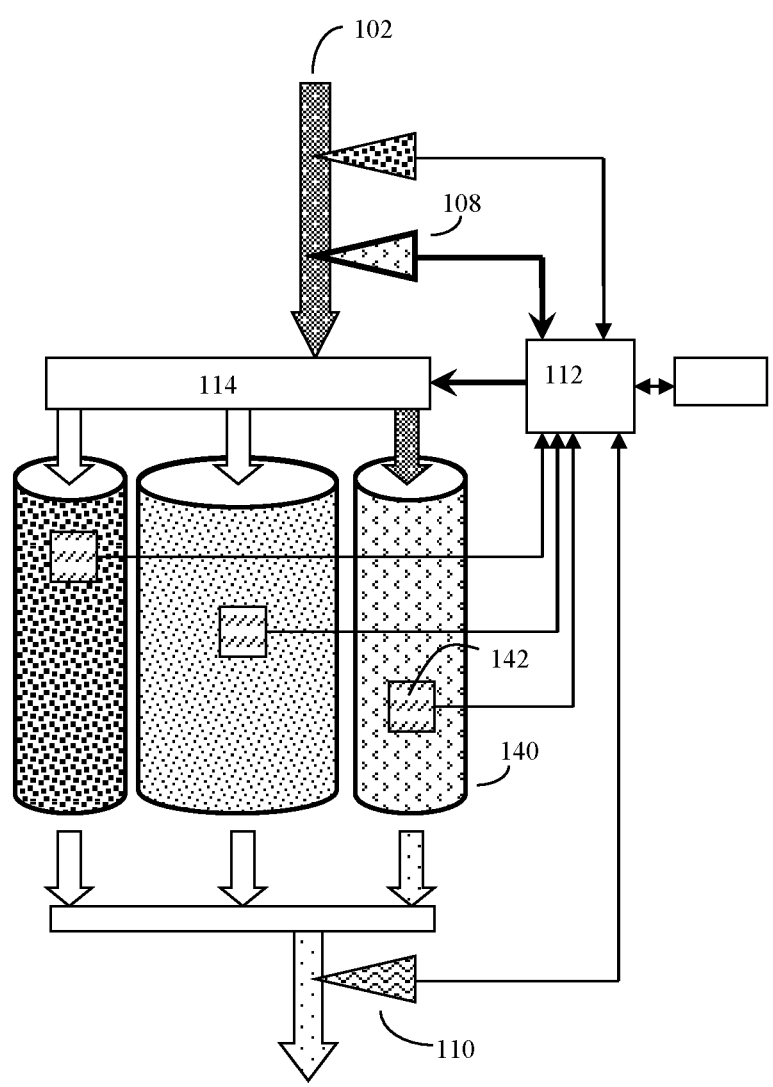
FIG. 3 shows how some embodiments of the device can also automatically switch to still another different cartridge, containing a more suitable biochar-based filtration material, in response to detecting other types of contaminants, such as certain organic chemical contaminants.

FIG. 3 shows how some embodiments of the device can also automatically switch to still another different cartridge, containing a more suitable biochar-based filtration material, in response to detecting other types of contaminants, such as certain organic chemical contaminants. In this example, assume that the analyte sensor (108) now detects a high level of organic chemical contaminants, such as pesticides or microplastic or pharmaceutically active substances, which cannot be adequately filtered by cartridges (120) and (130). However, memory chip (142) informs processor (112) that a third cartridge (140) can filter these organic chemical contaminants (this is because filter cartridge 140 contains a functionalized biochar material that can bind to these organic chemical contaminants, and the cartridge is still fresh). Here processor (112) can thus send signals to the valve (114) now directing the flow of water from the water intake port (102) to the third cartridge (140). As previously discussed, the processor (112) can use information from the analyte sensor (106), water flow sensor (120), and memory chip (142) to determine when the organic chemical filtration ability of cartridge (140) has been exhausted.

Experimental optimization of functionalized biochar materials was created as in the work of Jha, E., Mishra, B., Grun, "*Doped biochar for the removal of pesticides, emerging contaminants, and heavy metals from water*", presented at the ACS Fall 2020 Virtual Meeting & Expo in (Environmental Chemistry Section).

To better optimize the types of biochar used in this device, the applicant performed various experiments (studies), as reported below.

In these experiments, six kinds of biochar were experimented with different properties to maximize contaminant uptake. Specifically, a) surface area, b) catalyst presence, c) pore size, d) surface complexing agent presence, and e) and carbon composition was manipulated to enhance contaminant removal.

a) To determine the effect of surface area on sequestration efficiency, $MnO_2$—SH doped milled rice husk biochar was compared to $MnO_2$—SH doped (unmilled) rice husk biochar. Here, milling was the dependent variable.

b) To determine the effect of catalyst presence on sequestration efficiency, $MnO_2$—SH doped rice husk biochar was compared to SH doped rice husk biochar. Here, $MnO_2$ presence was the dependent variable.

c) To determine the effect of pore size on sequestration efficiency, ZnO—SH doped rice husk biochar was compared to SH doped rice husk biochar. Here, ZnO presence was the dependent variable.

d) To determine the effect of surface complexing agent presence on sequestration efficiency, SH doped rice husk biochar was compared to undoped rice husk biochar. Here, SH presence was the dependent variable.

e) To determine the effect of carbon composition on sequestration efficiency, undoped rice husk biochar was compared to undoped oak wood biochar. Here, the initial feedstock was the dependent variable.

Thus, a total of six different kinds of biochar were produced: (i) $MnO_2$—SH doped milled rice husk biochar (RHB), (ii) $MnO_2$—SH doped unmilled RHB, (iii) ZnO—SH doped RHB, (iv) SH doped RHB, (v) undoped RHB, and (vi) undoped oak wood biochar (OWB).

The data from table 1 below shows that $MnO_2$—SH doped milled RHB was the most effective for pp-DDT and pp-DDE removal from water.

TABLE 1

| Biochar Type | pp-DDT | pp-DDE |
|---|---|---|
| $MnO_2$—SH doped rice husk milled | 98.31% | 94.57% |
| $MnO_2$—SH doped rice husk | 85.77% | 81.77% |
| ZnO—SH doped rice husk | 74.45% | 79.72% |
| SH doped rice husk | 80.58% | 76.92% |
| Undoped rice husk | 78.75% | 74.90% |
| Undoped oak wood | 89.82% | 90.05% |

The data from table 2 below shows that the SH-functionalized, $MnO_2$-doped milled RHB was the most effective for dimetridazole removal as well.

TABLE 2

| Biochar Type | Dimetridazole |
|---|---|
| $MnO_2$—SH doped rice husk milled | 53.34% |
| $MnO_2$—SH doped rice husk | 29.18% |
| ZnO—SH doped rice husk | 44.48% |
| SH doped rice husk | 15.29% |
| Undoped rice husk | −1.55% |
| Undoped oak wood | 20.45% |

The data from table 3 below shows that the ZnO—SH doped RHB was the most effective for BPA removal.

TABLE 3

| Biochar Type | BPA |
|---|---|
| $MnO_2$—SH doped rice husk milled | 95.96% |
| $MnO_2$—SH doped rice husk | 93.12% |
| ZnO—SH doped rice husk | 96.49% |
| SH doped rice husk | 92.54% |
| Undoped rice husk | 83.08% |
| Undoped oak wood | 80.64% |

The data from table 4 below shows that $MnO_2$—SH doped milled RHB was most effective for heavy metal removal.

TABLE 4

| Biochar Type | Arsenic | Lead | Mercury | Cadmium |
|---|---|---|---|---|
| $MnO_2$—SH doped rice husk milled | 97.78% | 98.23% | 100.00% | 100.00% |
| $MnO_2$—SH doped rice husk | 96.39% | 95.39% | 97.12% | 98.79% |
| ZnO—SH doped rice husk | 94.99% | 95.60% | 99.66% | 100.00% |
| SH doped rice husk | 95.10% | 97.46% | 98.14% | 99.33% |
| Undoped rice husk | 46.48% | 65.28% | 64.30% | 48.81% |
| Undoped oak wood | 52.25% | 68.38% | 69.92% | 55.68% |

Note that other types of biochar and functionalized biochar may also be used, and thus the above findings are not intended to be limiting.

The invention claimed is:

1. A water filtration device, comprising:
A water intake port and a water exit port;
At least one analyte sensor configured as a heavy metal sensor to detect heavy metal contaminants in water, and generate an electronic signal in response to said heavy metal contaminants;
a water flow sensor configured to monitor a total flow of water through said water filtration device;
a processor configured to receive input from said heavy metal sensor and said water flow sensor;
at least one processor-controlled wireless transceiver;
a plurality of removable cartridges, said plurality of removable cartridges comprising:
a first removable cartridge comprising a first biochar material and a first electronic memory chip reporting on first water filtration properties of said first biochar material;
a second removable cartridge comprising a second biochar material and a second electronic memory chip reporting on second water filtration properties of said second biochar material;
wherein said first biochar material and said second biochar material differ in at least their ability to bind to heavy metal contaminants in water, and said first electronic memory chip and said second electronic memory chip provide information reporting on these differences;
a processor actuated valve configured to direct water from said water intake port to any of said first or second removable cartridge;
wherein said processor is configured to use information from said heavy metal sensor, said water flow sensor, said first electronic memory chip, and said second electronic memory chip to:
a) configure said processor actuator valve to distribute water from said water intake port to any of said first removable cartridge and said second removable cartridge so as to minimize at least an amount of said heavy metal contaminants in water flowing out of said water exit port; and
b) determine, based on a history of said total flow of water through said water filtration device, at least said heavy metal contaminants, and information from said first electronic memory chip and said second electronic memory chip, if any of said first or said second removable cartridge should be replaced;
and wherein said processor is further configured to transmit to at least one internet server, using said at least one processor-controlled wireless transceiver, at least said history of said total flow of water though said water filtration device, at least said heavy metal contaminants, and if any of said first or second removable cartridge should be replaced.

2. The water filtration device of claim 1, wherein any of said first or second biochar material comprises thiol-functionalized milled rice husk biochar, and said thiol-functionalized milled rice husk biochar binds to any of cadmium, mercury, and or lead.

3. The water filtration device of claim 2, wherein any of said first and second biochar material comprise thiol-functionalized milled rice husk biochar comprising $MnO_2$—SH doped milled rice husk biochar material.

4. The water filtration device of claim 2, wherein any of said first and second biochar material comprise thiol-functionalized milled rice husk biochar comprising ZnO—SH doped milled rice husk biochar material.

5. The water filtration device of claim 1, further comprising an analyte sensor configured as an organic chemical sensor that is configured to detect organic chemical contaminants in said water;
 wherein said processor is configured to use information from said heavy metal sensor, said organic chemical sensor, said water flow sensor, said first electronic memory chip, and said second electronic memory chip to:
 a) configure said processor actuator valve to distribute water from said water intake port to any of said first removable cartridge and said second removable cartridge so as to minimize both an amount of said heavy metal contaminants and an amount of said organic chemical contaminants in water flowing out of said water exit port; and
 b) determine, based on a history of said total flow of water through said water filtration device, said heavy metal contaminants, said organic chemical contaminants, and information from said first electronic memory chip and said second electronic memory chip, if any of a first or second removable cartridge should be replaced;
 and wherein said processor is further configured to transmit, to at least one said internet server, using said at least one processor-controlled wireless transceiver, at least said history of said total flow of water though said water filtration device, said heavy metal contaminants, said organic chemical contaminants, and said determination if any of said first or second removable cartridge should be replaced.

6. The water filtration device of claim 5, wherein said organic chemical contaminants comprises any of an organic chemical pesticide and an organic chemical pharmaceutical.

7. The water filtration device of claim 5, further comprising a third removable cartridge comprising a third biochar material, and a third electronic memory chip reporting on third water filtration properties of said third biochar material;
 wherein said first biochar material and said second biochar material differ from said third biochar material in at least their ability to bind to organic chemical contaminants in water;
 and wherein said processor is configured to use information from said heavy metal sensor, said organic chemical sensor, said water flow sensor, said first electronic memory chip, said second electronic memory chip, and said third electronic memory chip to:
 a) configure said processor actuated valve to distribute water from said water intake port to any of said first removable cartridge, said second removable cartridge, and said third removable cartridge so as to minimize both an amount of said heavy metal contaminants and an amount of said organic chemical contaminants in water flowing out of said water exit port; and
 b) determine, based on a history of said total flow of water through said water filtration device, said heavy metal contaminants, said organic chemical contaminants, and information from said first electronic memory chip, said second electronic memory chip, and said third electronic memory chip if any of a first or second or third removable cartridge should be replaced;
 and wherein said processor is further configured to transmit, to at least one said internet server, using said at least one processor-controlled wireless transceiver, at least said history of said total flow of water though said water filtration device, said heavy metal contaminants, said organic chemical contaminants, and said determination if any of said first or second or third removable cartridge should be replaced.

8. A water filtration device, comprising:
A water intake port and a water exit port;
At least one analyte sensor configured as a heavy metal sensor to detect heavy metal contaminants in water, and generate an electronic signal in response to said heavy metal contaminants, and an analyte sensor configured as an organic chemical sensor to detect organic chemical contaminants in said water;
a water flow sensor configured to monitor a total flow of water through said water filtration device;
a processor configured to receive input from said heavy metal sensor, said organic chemical sensor, and said water flow sensor;
at least one processor-controlled wireless transceiver;
a plurality of removable cartridges, said plurality of removable cartridges comprising:
a first removable cartridge comprising a first biochar material, and a first electronic memory chip reporting on first water filtration properties of said first biochar material;
a second removable cartridge comprising a second biochar material, and a second electronic memory chip reporting on second water filtration properties of said second biochar material;
a third removable cartridge comprising a third biochar material, and a third electronic memory chip reporting on third water filtration properties of said third biochar material;
wherein any of said first or second biochar material comprises thiol-functionalized milled rice husk biochar;
wherein said first biochar material and said second biochar material differ in at least their ability to bind to heavy metal contaminants in water;
wherein said first biochar material and said second biochar material differ from said third biochar material in at least their ability to bind to organic chemical contaminants in water;
and said first electronic memory chip and said second electronic memory chip and said third electronic memory chip provide information reporting on these differences;
a processor actuated valve configured to direct water from said water intake port to any of said first or second removable cartridge;
wherein said processor is configured to use information from said heavy metal sensor, said organic chemical sensor said water flow sensor, said first electronic memory chip, said second electronic memory chip, and said third electronic memory chip to:
a) configure said processor actuated valve to distribute water from said water intake port to any of said first removable cartridge, said second removable cartridge, and said third removable cartridge so as to minimize at least an amount of said heavy metal contaminants and organic chemical contaminants in water flowing out of said water exit port; and
b) determine, based on a history of said total flow of water through said water filtration device, at least said heavy metal contaminants, and information from said first electronic memory chip, said second electronic memory chip, and said third electronic memory chip, if any of said first, second, or third removable cartridge should be replaced;

and wherein said processor is further configured to transmit to at least one internet server, using said at least one processor-controlled wireless transceiver, at least said history of said total flow of water though said water filtration device, said heavy metal contaminants, said organic chemical contaminants, and if any of said first or second or third removable cartridge should be replaced.

9. The water filtration device of claim 8, wherein any of said first and second biochar material comprise thiol-functionalized milled rice husk biochar comprising $MnO_2$—SH doped milled rice husk biochar material.

10. The water filtration device of claim 8, wherein any of said first and second biochar material comprise thiol-functionalized milled rice husk biochar comprising ZnO—SH doped milled rice husk biochar material.

11. The water filtration device of claim 8, wherein said organic chemical contaminants comprises any of an organic chemical pesticide and an organic chemical pharmaceutical.

12. A water filtration device, comprising:
A water intake port and a water exit port;
At least one analyte sensor configured as a heavy metal sensor to detect heavy metal contaminants in water, and generate an electronic signal in response to said heavy metal contaminants, and at least one analyte sensor configured as an organic chemical sensor to detect organic chemical contaminants in said water;
wherein said organic chemical contaminants comprise any of an organic chemical pesticide contaminant and an organic chemical pharmaceutical contaminant.
a water flow sensor configured to monitor a total flow of water through said water filtration device;
a processor configured to receive input from said heavy metal sensor, said organic chemical sensor, and said water flow sensor;
at least one processor-controlled wireless transceiver;
a plurality of removable cartridges, said plurality of removable cartridges comprising:
a first removable cartridge comprising a first biochar material, and a first electronic memory chip reporting on first water filtration properties of said first biochar material;
a second removable cartridge comprising a second biochar material, and a second electronic memory chip reporting on second water filtration properties of said second biochar material;
a third removable cartridge comprising a third biochar material, and a third electronic memory chip reporting on third water filtration properties of said third biochar material;
wherein said first biochar material is a thiol-functionalized milled rice husk biochar;
wherein said second biochar material is a thiol-functionalized milled rice husk biochar comprising $MnO_2$—SH doped milled rice husk biochar material;
wherein said third biochar material is a thiol-functionalized milled rice husk biochar comprising ZnO—SH doped milled rice husk biochar material;
wherein said first biochar material and said second biochar material and said third biochar material differ in at least their ability to bind to heavy metal contaminants in water;
wherein said first biochar material and said second biochar material differ from said third biochar material in at least their ability to bind to organic chemical contaminants in water;
and said first electronic memory chip and said second electronic memory chip and said third electronic memory chip provide information reporting on these differences;
a processor actuated valve configured to direct water from said water intake port to any of said first or second removable cartridge;
wherein said processor is configured to use information from said heavy metal sensor, said organic chemical sensor, said water flow sensor, said first electronic memory chip, said second electronic memory chip, and said third electronic memory chip to:
a) configure said processor actuated valve to distribute water from said water intake port to any of said first removable cartridge, said second removable cartridge, and said third removable cartridge so as to minimize at least an amount of said heavy metal contaminants and organic chemical contaminants in water flowing out of said water exit port; and
b) determine, based on a history of said total flow of water through said water filtration device, at least said heavy metal contaminants, and information from said first electronic memory chip, said second electronic memory chip, and said third electronic memory chip, if any of said first, second, or third removable cartridge should be replaced;
and wherein said processor is further configured to transmit to at least one internet server, using said at least one processor-controlled wireless transceiver, at least said history of said total flow of water though said water filtration device, said heavy metal contaminants, said organic chemical contaminants, and if any of said first or second or third removable cartridge should be replaced.

* * * * *